United States Patent [19]

Siewert

[11] 4,191,150
[45] Mar. 4, 1980

[54] ENGINE WITH SELECTIVE VENTING OF UNBURNED MIXTURE FROM THE PISTON CREVICE VOLUME

[75] Inventor: Robert M. Siewert, Birmingham, Mich.

[73] Assignee: General Motors Corporation, Detroit, Mich.

[21] Appl. No.: 890,598

[22] Filed: Mar. 20, 1978

[51] Int. Cl.² .............................................. F02M 25/06
[52] U.S. Cl. ................................ 123/119 B; 123/75 C; 123/193 C; 123/193 CP
[58] Field of Search ........... 123/119 B, 119 A, 193 P, 123/75 C, 193 CP

[56] References Cited

U.S. PATENT DOCUMENTS

| | | | |
|---|---|---|---|
| 3,583,375 | 6/1971 | Pischinger | 123/75 C X |
| 3,667,443 | 6/1972 | Currie et al. | 123/193 P |
| 3,703,164 | 11/1972 | Weaving | 123/119 A |
| 3,905,344 | 9/1975 | Villella | 123/119 A |
| 3,982,514 | 9/1976 | Turns et al. | 123/119 A |

*Primary Examiner*—Wendell E. Burns
*Attorney, Agent, or Firm*—Robert J. Outland

[57] ABSTRACT

The exhaust of unburned hydrocarbons from an internal combustion engine is reduced by selective venting of unburned air-fuel mixture trapped in the piston-cylinder crevice volume in advance of each engine exhaust stroke. Exemplary venting means disclosed include (1) a bypass channel in the cylinder wall which bypasses the piston rings and connects the crevice volume with the engine crankcase in the lower portions of the piston stroke and (2) a cylinder pressure actuated valve controlled bypass passage in the piston which accomplishes a similar function. Location of the bypass channel or passage near to the exhaust valve permits the selective retention of unburned hydrocarbon containing mixture distant from the exhaust valve and thus unlikely to be discharged in the exhaust process. Bypassed mixture is recycled from the crankcase to the inlet manifold with the engine blowby gases for combustion in the cylinders.

4 Claims, 4 Drawing Figures

FUEL & AIR
EXHAUST
LEAKAGE
CRANKCASE

ENGINE WITH SELECTIVE VENTING OF UNBURNED MIXTURE FROM THE PISTON CREVICE VOLUME

BACKGROUND OF THE INVENTION

This invention relates to internal combustion engines and more particularly to methods and means for bypassing selected portions of unburned air-fuel mixture in the piston's crevice volumes to the engine crankcase for recycling to the induction system, thus reducing the exhaust of hydrocarbons from the engine combustion chambers on their respective exhaust strokes.

It has been hypothesized that unburned hydrocarbons in the exhaust gases of internal combustion engines include quench gases from the combustion chamber surfaces and crevice volumes in the spaces between the piston and cylinder wall where unburned mixture is present after the end of combustion in the engine cylinders. It is thought that such residual mixtures as are located near the vicinity of the exhaust valve are most likely to be swept out with the exhaust gases during the engine exhaust stroke. Unburned mixture forced into the piston-cylinder crevice volumes is expanded as cylinder pressures are reduced and thus passes out into the main body of the combustion chamber to be carried out with the exhaust gases.

Various means and methods have been proposed for preventing the exhaust of some of these unburned hydrocarbons and retaining or recycling them to the combustion chambers for burning. Two examples of prior art methods and arrangements are found in U.S. Pat. Nos. 3,667,443 Currie and Mick and 3,982,514 Turns and Siewert, both assigned to the assignee of the present invention. The arrangement of Currie and Mick vents the space between the piston and cylinder intermediate the first and second piston rings of an engine to bleed off unburned air-fuel mixture from this location below the top piston ring. Turns and Siewert disclose an arrangement for timed venting of portions of the combustion chamber walls to remove collected wall quenched combustibles therefrom and recycle them for reburning.

SUMMARY OF THE INVENTION

The present invention provides still another method and arrangement for removing from the engine cylinders selected portions of the unburned mixture to prevent their discharge with the burned exhaust gases. This invention is directed primarily to removal of some or all of the unburned air-fuel mixture compressed into the piston-cylinder crevice volume, which for purposes of this disclosure is defined as the clearance space between the piston and cylinder walls located above the top piston ring and open to the main combustion chamber. The mixture is removed during the latter portions of the expansion stroke by venting the crevice volume (space above the top piston ring) to the engine crankcase through one or more limited flow bypass passages which are open during a limited portion of each cycle.

Such bypass arrangements may constitute one or more channels in the cylinder wall opened by the downward passage of the piston at a predetermined point in the expansion stroke. Alternatively, a pressure actuated valve controlled passage may be provided in the piston for accomplishing the purpose. Preferably, the bypass means are located on the exhaust valve side of the cylinder or piston so that the unburned mixture is selectively removed from the portion of the combustion chamber adjacent the exhaust valve, resulting in an effective reduction of exhaust gas hydrocarbons with selective retention of some unburned mixture within the cylinder, but distant from the exhaust valve.

These and other features of the invention will be more fully understood from the following description of certain preferred embodiments taken together with the accompanying drawing.

DESCRIPTION OF THE ILLUSTRATED EMBODIMENTS

Figure 2:
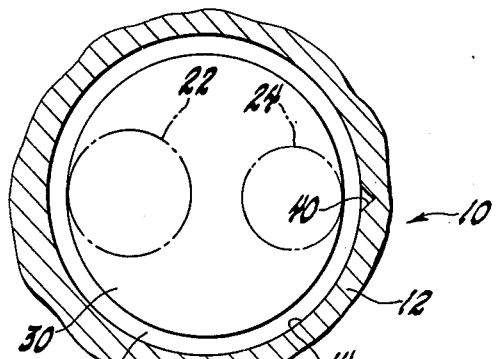
FIG. 2 is a cross-sectional view through the cylinder portion of the engine of FIG. 1 taken generally in the plane indicated by the line 2—2.
Figure 1:
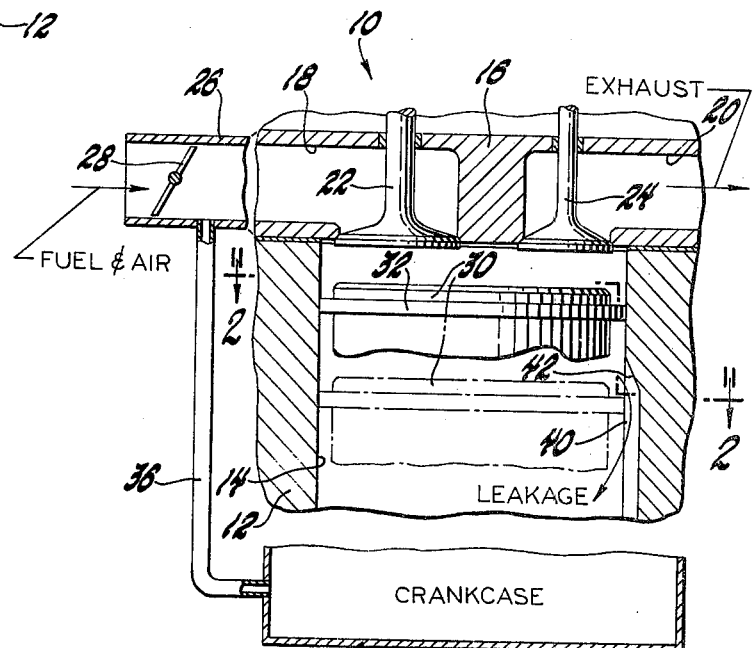
FIG. 1 is a fragmentary cross-sectional view illustrating, in part diagramatically, pertinent portions of an internal combustion engine cylinder arrangement having mixture bypass means in accordance with the invention.

Referring now to the drawing in detail, FIGS. 1 and 2 represent an internal combustion engine generally indicated by numeral 10. Engine 10 is conventionally provided with a cylinder block 12 having a plurality of cylinders 14, only one of which is shown.

The upper ends of the cylinders 14 are closed by a cylinder head 16 defining at each cylinder location an inlet port 18 and an exhaust port 20 which open into the closed end of the cylinder at laterally spaced locations adjacent opposite sides of the cylinder. The ports 18, 20 are respectively closed by an inlet valve 22 and an exhaust valve 24 which are operable in conventional fashion to control the flow of air-fuel mixture into and exhaust gases out of the cylinder.

The inlet port 18 connects upstream, through suitable means such as an intake manifold not shown, with an inlet conduit and throttle body 26 in which is a throttle 28. Means, such as a carburetor not shown, are also provided to supply an air-fuel mixture to the throttle body, the throttle being adjustable in conventional fashion to control the rate of flow of air-fuel mixture through the throttle body and inlet conduit to the inlet port and thus to the respective cylinder.

Within each cylinder 14 there is reciprocably disposed a piston 30 which is conventionally provided with sealing means in the form of piston rings, only the upper one 32 of which is shown in the drawing. The piston is conventionally connected with a crankshaft, not shown, upon rotation of which the piston is caused to reciprocate in the cylinder between a top dead center position, which may be slightly above the position of the piston as shown in solid lines in FIG. 1, and a bottom dead center position, which may be essentially as shown by the phantom lines in FIG. 1.

Below the pistons and at the open ends of the cylinders in the engine there is provided a crankcase 34 which is adapted to collect lubricating oil from the running parts of the engine and to receive blowby gases from the engine cylinders which leak past the piston rings from the combustion chambers at the closed ends of the cylinders. These blowby gases are recycled to the engine induction system through a conduit 36 which connects the crankcase 34 with the throttle body 26 downstream of the throttle 28. A crankcase ventilation flow control valve or other flow control means, not shown, may be utilized in conjunction with the conduit 36 to control the rate of flow of crankcase vapors and blowby gases therethrough.

In accordance with the invention, each engine cylinder wall is provided with a V-shaped groove or bypass channel 40 which begins at a point below the top of the respective cylinder and extends downwardly toward the crankcase to the cylinder open end, or at least to a point below the lowest position of travel of the piston skirt. The size and shape of the channel, as well as its upward extent in the cylinder, is chosen to provide a desired flow area for combustion gases past the piston rings at various positions in the piston travel.

Figure 3:
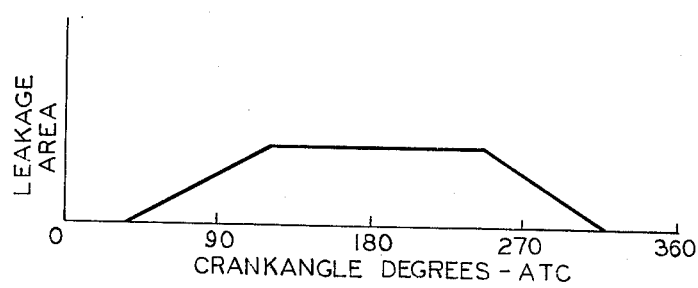
FIG. 3 is a graphical illustration of the variation in bypass flow area at various crankangle positions for the engine arrangement illustrated in FIGS. 1 and 2.

FIG. 3 illustrates one example of how the flow area past the piston rings might be varied at various piston positions using an arrangement of the sort shown in FIGS. 1 and 2. In this arrangement, the top piston ring is above the extent of the bypass channel 40 as the piston moves downwardly from its top dead center position until it reaches about 45 degrees after top center. At this point, the channel begins to open, its sloping upper end 42 causing an increase in flow area until the piston has moved downwardly to somewhat past the 90 degrees after top center position. Thereafter, the flow area remains constant until the piston is again on the upward stroke approaching 90 degrees before top center, at which time the flow area is again reduced and drops off to zero at about 45 degrees before top center.

In operation, combustion of air-fuel mixtures compressed in the cylinder by the piston compression stroke is relatively complete in the open areas of the combustion chamber. Nevertheless, unburned fuel mixture remains after combustion in the crevice volumes defined between the piston and cylinder, particularly in the space above the top compression ring. As the piston moves downwardly on the expansion stroke, the top ring 32 moves below the top of channel 40 which thereafter connects the crevice volume adjacent the position of the exhaust valve with the engine crankcase, the flow area increasing as the piston moves downwardly. This allows bleedoff of at least some of the unburned mixture from the crevice volume and adjacent areas, especially at the position of the exhaust valve. The bypassed unburned mixture is then recycled from the crankcase through conduit 36 to the engine intake where it is mixed with air-fuel mixture for admission and burning in the cylinders.

When the piston again moves upwardly on the following exhaust stroke, the unburned mixture in the crevice volume has at least in part been replaced by burned mixture, and thus its expansion into the open part of the combustion chamber as pressures are reduced does not leave a significant volume of unburned air-fuel mixture in position to be discharged through the exhaust port with the exhaust gases. In this way, hydrocarbons in the exhaust gases are reduced.

The size of the channel 40 and the flow area it represents must, of course, be selected in a manner that accomplishes the desired purpose of bleeding off unburned fuel mixture from the crevice volume without at the same time causing a large flow or bypassing of gases sufficient to adversely affect compression or expansion pressures and yield significant decreases in thermal efficiency. In a test of the concept, the channel area at its maximum was about 2.8 square millimeters, which was about 60 times larger than the top ring gap area and only about 0.03 percent of the area of the cylinder bore. The top ring uncovered this leakage area at about 110 degrees after top dead center (70 percent of maximum stroke). In the single cylinder test engine under one test comparison condition on the dynamometer, the use of this channel lowered exhaust hydrocarbon emissions more than 50 percent, while the measured compression loss was only about 3.4 kilopascals, or less than 0.6 percent of the indicated mean effective pressure of the engine at the tested load condition.

Figure 4:
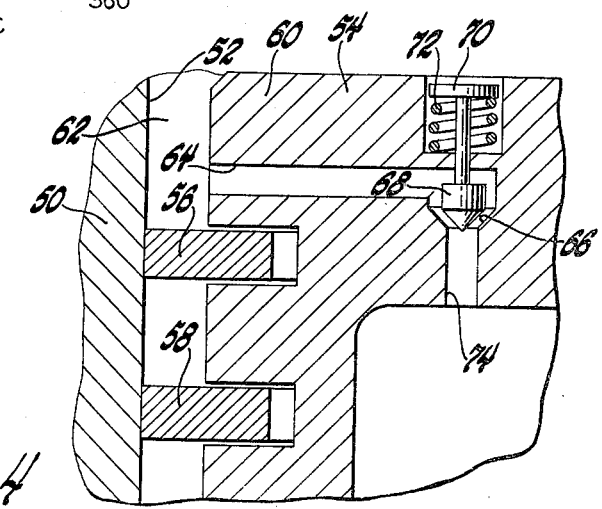
FIG. 4 is a fragmentary cross-sectional view of an alternative embodiment illustrating a cylinder pressure actuated valve controlled passage in the piston.

Referring now to FIG. 4 of the drawing, there is shown an alternative embodiment of the invention designed to accomplish in somewhat similar fashion the partial bypassing of unburned air-fuel mixture from the crevice volume area. In this arrangement, the engine cylinder block 50 defines a cylinder 52 containing a reciprocable piston 54 having piston rings 56, 58. The upper portion 60 of the piston extending above the top piston ring 56 defines with the cylinder 52 a crevice volume 62 in which unburned air-fuel mixture collects during operation.

The piston 54 includes a drilled passage 64 extending from the crevice volume 62 to a valve seat 66 which is contacted by a pressure actuated valve 68. Valve 68 has a plunger 70 that is exposed to cylinder pressures and a spring 72 which urges the valve in an opening direction, holding the valve open except when cylinder pressures are above the level needed to overcome the force of the spring. A second passage 74 extending from the valve seat to the interior of the piston joins with passage 64 to connect the piston crevice volume 62 with the engine crankcase whenever the valve 68 is open. The crankcase gases are recycled to the induction system of the engine in the same manner as indicated with respect to the embodiment of FIGS. 1 and 2.

In operation, upward movement of the piston on the compression stroke increases cylinder pressures and closes the valve 68, closing off the bypass passage 64, 74. Following combustion, downward movement of the piston on the expansion stroke reduces cylinder pressure so that at a predetermined pressure valve 68 opens, allowing residual pressure in the cylinder to force unburned fuel mixture in the crevice volume 62 through the passage 64, 74 to the engine crankcase. The actuating pressure of the valve 68 is preferably selected so that the valve opens at some point in advance of the opening of the exhaust valve of the engine so that the crevice volume is essentially free of unburned hydrocarbons before the piston moves upward on the exhaust stroke.

In either of the disclosed embodiments it is possible to provide one or more bypass passages for the bypassing of unburned mixture from one or more areas of the crevice volume to the engine crankcase. It is preferable, however, that the bypass passages be located in the area of the exhaust valve so that unburned mixture from the crevice volume in this area will be preferentially swept out of the engine combustion chamber. Residual unburned mixture in the crevice volume on the intake valve side of the combustion chamber may, if desired, be retained in the chamber for burning on the next following cycle.

While the invention has been described by reference to certain specific embodiments chosen for purposes of illustration, it should be understood that various changes could be made in the disclosed embodiments without departing from the inventive concepts disclosed. Accordingly, it is intended that the invention not be limited to the disclosed embodiments, but that it have the full scope permitted by the language of the following claims.

What is claimed is:

1. An internal combustion engine having a cylinder with closed and open ends, a piston reciprocably disposed in the cylinder with one end opposing the cylinder closed end to define a combustion space therebetween with an annular crevice volume around said piston one end formed by clearance between the piston and cylinder, the piston being reciprocable between extreme top and bottom dead center positions, respectively, nearest to and farthest from the cylinder closed end, seal means on the piston spaced from said one end and engaging the cylinder to seal the combustion space and crevice volume from the cylinder open end and thus limit blowby leakage from the combustion space to the cylinder open end, intake means for admitting air to the combustion space for compression during a first piston stroke toward top dead center and the subsequent combustion of fuel therein, exhaust means for permitting discharge of combustion products from the combustion space following expansion on a second piston stroke toward bottom dead center, and means for collecting and recirculating to the intake means blowby gases escaping from the combustion space to the open end of the cylinder, and the improvement comprising bypass means operative to open a limited passage for gas flow from the crevice volume to the cylinder open end during each piston expansion stroke, substantially after the beginning thereof but in advance of the opening of said exhaust means on each said expansion stroke, whereby unburned fuel-air mixture is removed from the crevice volume before the exhaust step and recirculated to the intake means for readmission and burning in the cylinder, thus reducing the exhaust of unburned products from the engine.

2. An engine as defined in claim 1 wherein said bypass means comprises at least one limited flow channel in the wall of said cylinder which bypasses the piston seal means only during the lower portions of piston travel beginning at a point shortly before opening of said exhaust means on the expansion stroke.

3. An engine as defined in claim 2 wherein said limited flow channel is disposed in said cylinder wall at a location nearer to the exhaust means than to the inlet means causing preferential depletion of unburned crevice volume fuel-air mixture locally near the exhaust means and the resulting selective retention in the cylinder of crevice volume mixture distant from the exhaust means.

4. An engine as defined in claim 1 wherein said bypass means comprises a bypass passage through the piston connecting the outer side of the piston above the piston seal means with the open end of the cylinder and a bypass valve in said bypass passage, said bypass valve being biased to an open position and responsive to pressure in the combustion chamber to close above a predetermined pressure level, whereby said bypass passage is open for flow only when the cylinder pressure is below said predetermined level.

* * * * *